(12) United States Patent
Naik et al.

(10) Patent No.: US 7,600,391 B2
(45) Date of Patent: Oct. 13, 2009

(54) COOLANT-BASED REGENERATIVE ENERGY RECOVERY SYSTEM

(75) Inventors: Sanjeev M. Naik, Troy, MI (US); Jeffrey M. Pleune, Rochester Hills, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 277 days.

(21) Appl. No.: 11/221,407

(22) Filed: Sep. 7, 2005

(65) Prior Publication Data

US 2006/0053814 A1 Mar. 16, 2006

Related U.S. Application Data

(60) Provisional application No. 60/608,608, filed on Sep. 10, 2004.

(51) Int. Cl.
*B60H 1/32* (2006.01)
(52) U.S. Cl. .......................... 62/238.6; 62/244
(58) Field of Classification Search ........... 62/239–244, 62/238.6–238.7, 324.1–324.6
See application file for complete search history.

(56) References Cited

U.S. PATENT DOCUMENTS

| | | | |
|---|---|---|---|
| 2,194,530 A * | 3/1940 | Torstensson | 62/241 |
| 3,894,405 A * | 7/1975 | Mielitz | 62/241 |
| 5,507,153 A * | 4/1996 | Seto et al. | 62/133 |
| 6,370,903 B1* | 4/2002 | Wlech | 62/324.6 |
| 6,569,550 B2* | 5/2003 | Khelifa | 429/13 |
| 6,574,977 B2* | 6/2003 | Ozaki et al. | 62/210 |
| 6,865,901 B2* | 3/2005 | Horn et al. | 62/238.6 |
| 7,086,246 B2* | 8/2006 | Yoshii et al. | 62/238.7 |
| 7,152,422 B2* | 12/2006 | Takano et al. | 62/238.6 |
| 7,287,581 B2* | 10/2007 | Ziehr et al. | 165/202 |
| 2004/0000161 A1* | 1/2004 | Khelifa et al. | 62/324.1 |
| 2005/0138941 A1* | 6/2005 | Kikuchi | 62/178 |
| 2006/0037339 A1* | 2/2006 | Hassel et al. | 62/244 |

* cited by examiner

*Primary Examiner*—William E Tapolcai

(57) ABSTRACT

An apparatus for the recovery of energy from regenerative braking events in a vehicle is provided. A braking system is configured to selectively transmit energy from a wheel to the compressor of a heat pump/refrigerant loop. The apparatus may store recovered energy in the heat capacity of a coolant fluid to assist powertrain heating or cooling.

3 Claims, 3 Drawing Sheets

COOLANT-BASED REGENERATIVE ENERGY RECOVERY SYSTEM

CROSS REFERENCE TO RELATED APPLICATION

This application claims the benefit of U.S. Provisional Patent Application No. 60/608,608, filed Sep. 10, 2004, and which is hereby incorporated by reference in its entirety.

TECHNICAL FIELD

This invention relates to vehicles having a braking system configured to selectively transmit energy from a wheel to a compressor that is in fluid communication with a heat exchanger.

BACKGROUND OF THE INVENTION

Conventional vehicle braking systems employ friction elements to provide resistance to wheel rotation. The friction elements in such conventional braking systems convert the kinetic energy of a moving vehicle to heat, which then escapes to the atmosphere.

Regenerative braking systems have been proposed to recover the kinetic energy of the vehicle and store the energy in an energy storage device for use during vehicle acceleration or other vehicle functions. Energy storage devices proposed for regenerative braking include electrochemical batteries, ultracapacitors, and flywheels.

SUMMARY OF THE INVENTION

A vehicle characterized by regenerative braking is provided. The vehicle includes a ground wheel, a fluid circuit having a compressor configured to pressurize a fluid, and at least one heat exchanger in fluid communication with the compressor. The vehicle further includes a braking system configured to selectively transmit or convey energy from the wheel to the compressor, which uses the energy to pressurize the fluid.

The vehicle provided thus enables the kinetic energy of the moving vehicle to be transformed into thermal energy, i.e., to create a temperature differential, at the heat exchanger that is useful for heating or cooling other fluids or components in the vehicle. In an exemplary embodiment, the heat exchanger is an evaporator that absorbs heat from a powertrain cooling system. The heat exchanger may also be a condenser that raises the temperature of a powertrain cooling system before an energy conversion system has attained an optimum operating temperature after a cold start.

A method of regenerative braking is also provided. The method includes removing kinetic energy from a moving vehicle, and using the energy to alter the temperature of the fluid in a fluid circuit such as a powertrain cooling system.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
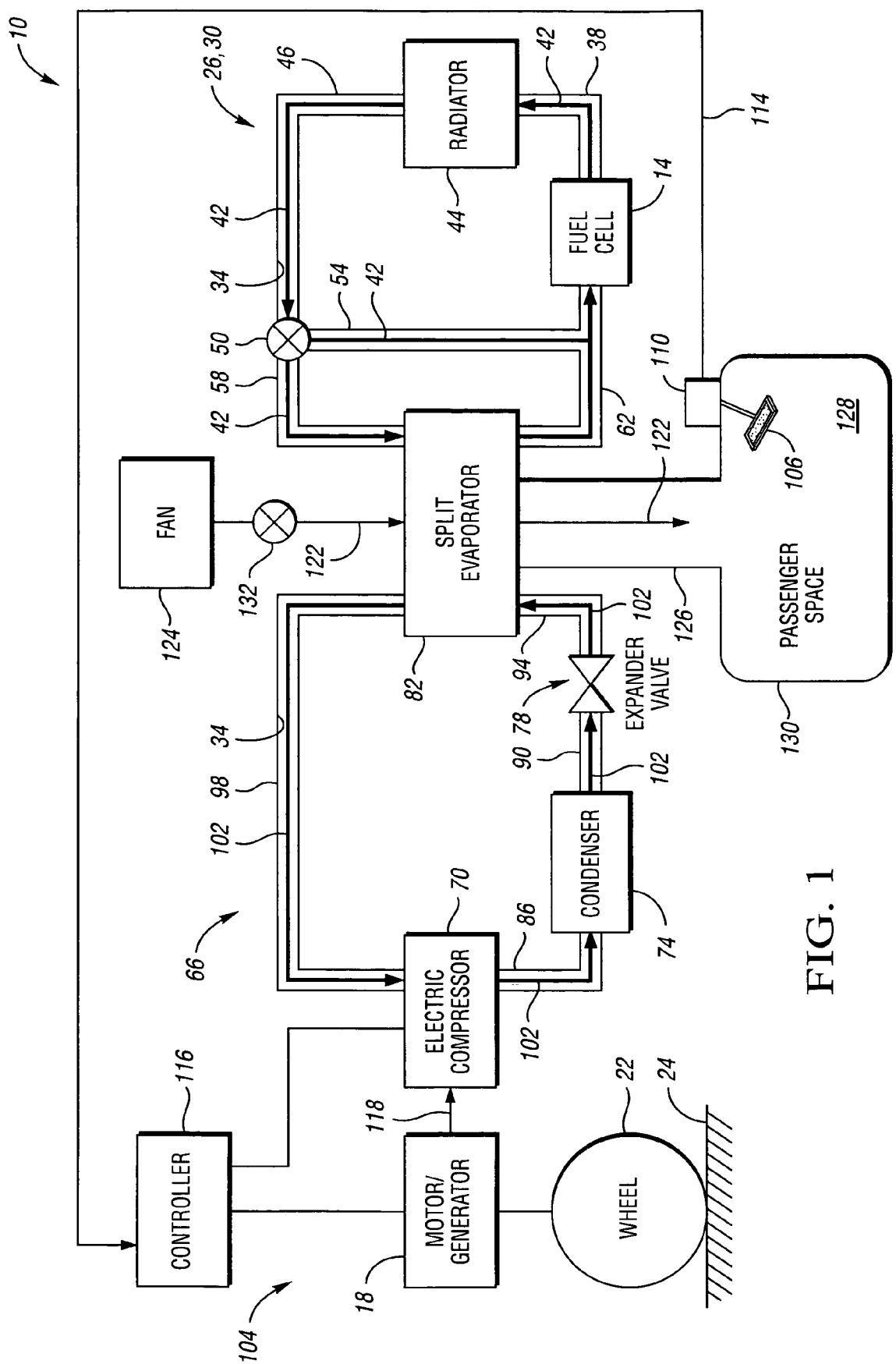
FIG. 1 is a schematic depiction of a vehicle having a braking system configured to selectively transfer energy from a wheel to a compressor for pressurizing fluid in a fluid circuit.

Referring to FIG. 1, a vehicle 10 includes an energy conversion system, such as fuel cell 14 that produces electrical energy in an electrochemical reaction between stored hydrogen and atmospheric oxygen. Electrical energy produced by the fuel cell 14 is selectively directed to an electric motor/generator 18. The rotor of motor/generator 18 is connected to a road wheel 22 that engages the ground 24, i.e., the surface upon which the vehicle travels. The fuel cell 14 produces waste heat, which must be removed from the fuel cell 14 in order to maintain efficient fuel cell operation. Although the energy conversion system is a fuel cell in the embodiment depicted, any waste-heat producing energy conversion system may be employed within the scope of the claimed invention. For example, the energy conversion system may be an internal combustion engine.

A cooling system 26 for the fuel cell 14 includes a first fluid circuit 30 that includes a plurality of conduits defining passages 34 to convey coolant 42. One of the conduits 38 provides fluid communication between the fuel cell 14, which transfers thermal energy to the coolant, and a radiator 44 that transfers thermal energy from the coolant to the environment. Another conduit 46 is configured to convey coolant 42 from the radiator 44 to a valve 50. The first fluid circuit may include a pump (not shown) to drive the coolant 42 through the first circuit.

The vehicle 10 also includes a second fluid circuit 66 having a compressor 70, a first heat exchanger 74, an expansion valve 78, and a second heat exchanger 82. As referred to in the appended claims, the order of the first and second fluid circuits could be altered. Conduit 86 provides fluid communication between the compressor 70 and the first heat exchanger 74; conduit 90 provides fluid communication between the first heat exchanger 74 and the expansion valve 78; conduit 94 provides fluid communication between the expansion valve 78 and the second heat exchanger 82; and conduit 98 provides fluid communication between the second heat exchanger 82 and the compressor 70. Thus, the elements of the second fluid circuit 66, namely the compressor 70, heat exchanger 74, expansion valve 78, and heat exchanger 82, are in series fluid communication.

The second fluid circuit 66 is a refrigerant loop. In a first mode of operation, the second fluid circuit 66 is configured so that refrigerant 102 in a gaseous state is compressed by compressor 70, conveyed to the first heat exchanger 74 where the refrigerant 102 releases thermal energy to the environment and is transformed to a liquid state. The first heat exchanger 74 thus functions as a condenser. The refrigerant 102 is then conveyed through expansion valve 78 to the second heat exchanger 82, where the refrigerant evaporates and, in the process, absorbs thermal energy in the second heat exchanger 82. The second heat exchanger 82 thus functions as an evaporator.

Valve 50 is manipulable to selectively cause coolant 42 to flow through conduit 54 or through conduit 58. Conduit 54 is in fluid communication with conduit 62, which directs coolant to fuel cell 14. Conduit 58 is in fluid communication with the second heat exchanger 82, which together form a bypass coolant flow path. Thus, valve 50 is manipulable to direct the coolant 42 from the radiator 44 to the fuel cell 14 or to the second heat exchanger 82. When the coolant 42 is directed to the second heat exchanger 82, thermal energy from the coolant 42 is transferred to refrigerant 102, thus reducing the temperature of coolant 42. Coolant 42 then enters conduit 62, where it is directed to the fuel cell 14 to be in heat exchange relationship therewith.

The vehicle 10 is also configured for regenerative braking whereby the kinetic energy of the moving vehicle 10 is recovered and reused, rather than simply dissipated as heat as in conventional friction-based braking systems. A braking system 104 includes a driver-operable input device, such as brake pedal 106, that is connected to a transducer or sensor 110. The sensor 110 is configured to transmit a signal 114 indicative of brake pedal application to a controller 116. The controller 116 is programmed and configured to cause the braking system 104 to transmit or convey energy from the wheel 22 to the compressor 70 in response to signal 114. More specifically, in the embodiment depicted, the wheel 22 rotates the rotor of motor/generator 18 so that motor/generator generates electrical energy 118. The motor/generator 18 resists rotation of the wheel 22, causing the vehicle to reduce speed while converting the kinetic energy of the vehicle into the electrical energy 118. The electrical energy 118 is transmitted to the compressor 70, either directly or by an electrical distribution system such as a bus (not shown). The electrical energy 118 then powers the compressor 70, supplying the energy for compressing refrigerant 102. Compressor 70 includes an electric motor (not shown) for rotating an impeller (not shown).

Thus, during regenerative braking with fluid circuit 66 in the first mode, the braking system 104 transforms kinetic energy of the vehicle 10 into electrical energy, which powers the compressor 70 to cool coolant 42 in the second heat exchanger 82 and thereby lower powertrain thermal loads.

Alternatively, other devices and techniques for providing selective energy flow communication between the wheel 22 and the compressor 70 may be employed within the scope of the claimed invention. For example, a selectively engageable clutch (not shown) controlled by the controller may provide a direct mechanical connection whereby the wheel rotates the impeller of the compressor.

The second heat exchanger 82 of FIG. 1 is a "split" evaporator, with part of the evaporator configured to exchange thermal energy with the coolant 42, and part of the evaporator configured to exchange thermal energy with air 122 for the vehicle's air conditioning system. A fan 124 directs air 122 through the evaporator to cool the air. Ductwork 126 conveys the air from the evaporator to a passenger compartment 128 formed by the vehicle body 130. The flow of air 122 through the evaporator 82 is controlled by valve 132.

Figure 2:
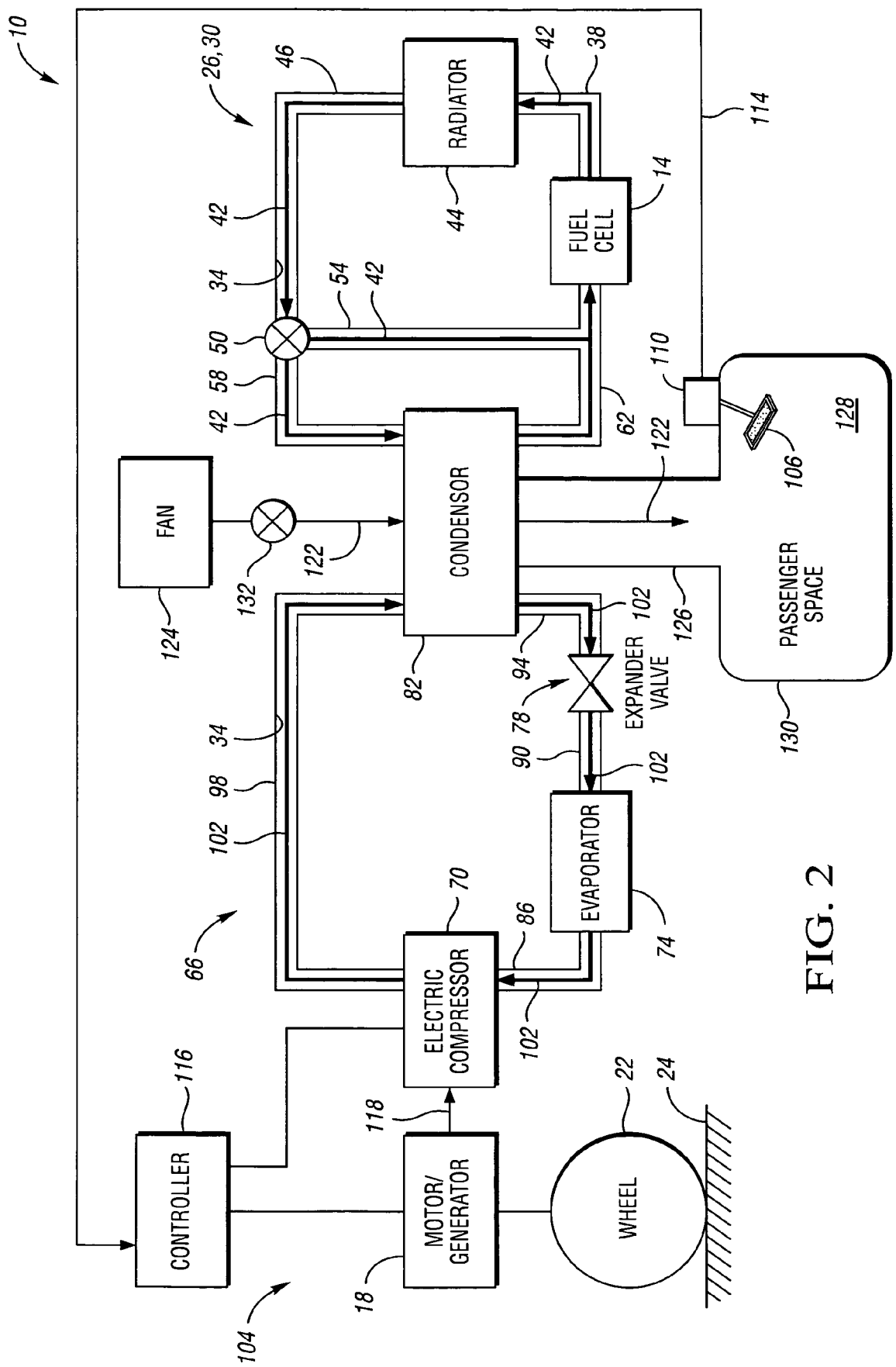
FIG. 2 is a schematic depiction of the vehicle of FIG. 1 with the direction of fluid travel reversed in the fluid circuit.

Referring to FIG. 2, wherein like reference numbers refer to like components from FIG. 1, the second circuit 66 is selectively reconfigurable via valves (not shown) or the like to operate in a second mode in which the refrigerant 102 flows through circuit 66 in a direction opposite that of the first mode. More specifically, in the second mode the compressor 70 compresses the refrigerant 102 so that it is heated and flows through conduit 98 to the second heat exchanger 82, and the second heat exchanger functions as a condenser. The heated refrigerant 102 transfers thermal energy to the coolant 42 in the second heat exchanger so that the temperature of the coolant 42 is increased. Thus, the energy recovered in regenerative braking via the compressor is converted to heat that is ultimately transferred to the fuel cell 14 in the first fluid circuit 30. Similarly, the energy may assist the heating of air 122 conveyed through the second heat exchanger 82 for passenger comfort.

The refrigerant 102 flows from heat exchanger 82, through the expansion valve 78, to heat exchanger 74, which functions as an evaporator to obtain thermal energy from the surrounding environment. It should be noted that fluid circuit 66 may operate in the second mode without heat exchanger 74. Accordingly, it is contemplated that a fluid circuit may employ a single heat exchanger in fluid communication with a compressor within the scope of the claimed invention; such a fluid circuit would transfer thermal energy at the heat exchanger, but not absorb thermal energy at the heat exchanger.

Referring to FIGS. 1 and 2, the second fluid circuit 66 is controllable by the controller 116 to selectively alternate between the first and second modes of operation. The controller 116 is configured to cause the first mode of operation, wherein the second heat exchanger functions as an evaporator, when a first predetermined condition is present. For example, the controller 116 may monitor the temperature of the coolant 42 with a sensor (not shown). When the temperature of the coolant 42 is above a predetermined temperature, the controller 116 causes the first mode of operation so that the coolant 42 is cooled in the heat exchanger 82.

The controller is also configured to cause the second mode of operation, wherein the second heat exchanger functions as a condenser, when a second predetermined condition is present. For example, when the temperature of coolant 42 is below the predetermined temperature, e.g., after a cold start and before the fuel cell has reached operating temperature, the controller 116 causes the second mode of operation so that coolant 42 is heated in the heat exchanger 82.

It is contemplated that the vehicle 10 may also be configured for regenerative braking whereby recovered kinetic energy is stored in a battery or other electrical storage device. For example, recovered energy may be directed to the compressor when the battery is fully charged, or when the rate of energy recovery from regenerative braking exceeds the maximum battery charging rate.

Valve 50 is controllable by the controller so that when one or more predetermined conditions are present, the coolant 42 flow bypasses heat exchanger 82.

Figure 3:
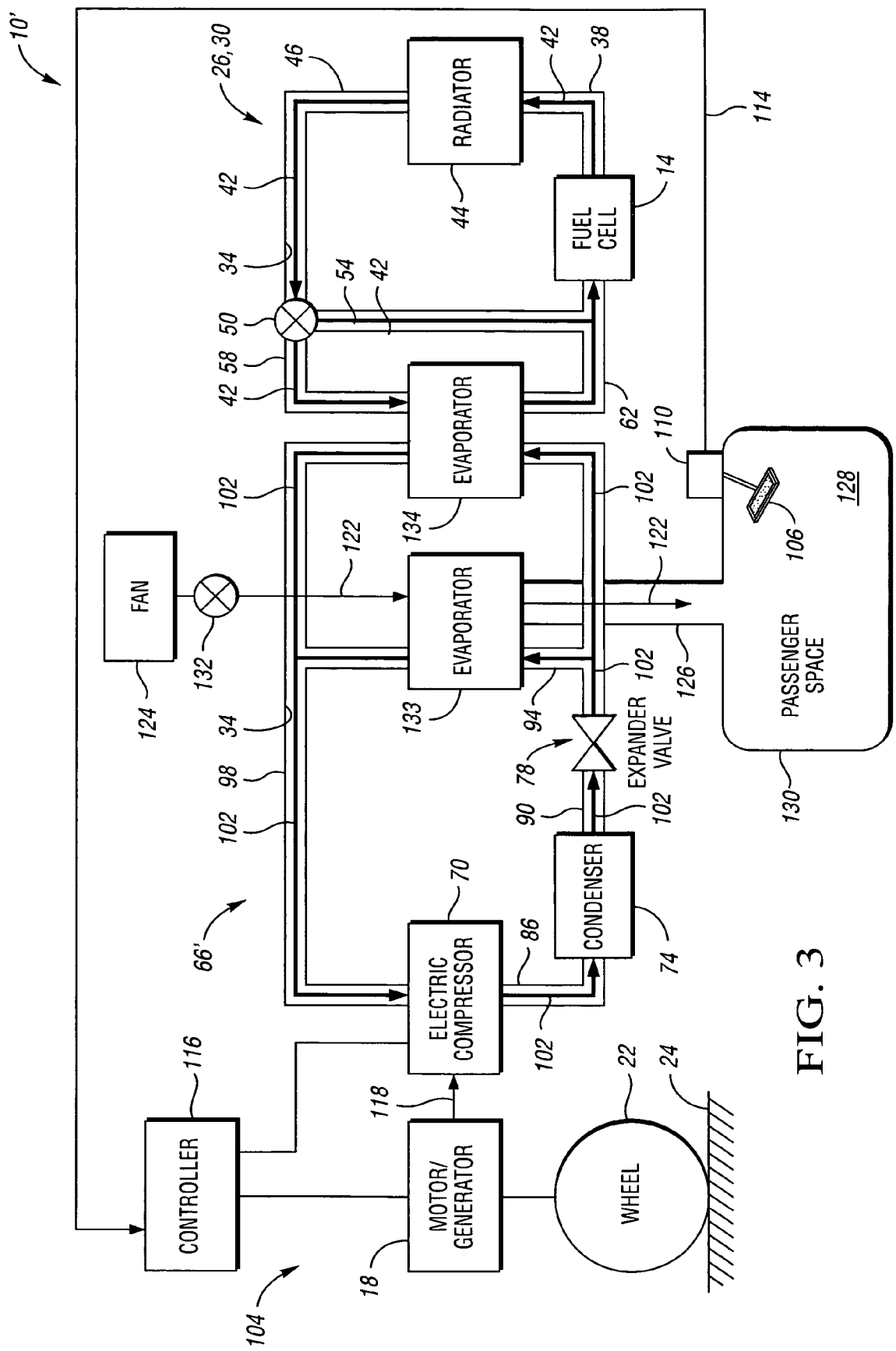
FIG. 3 is a schematic depiction of a vehicle having an alternative fluid circuit configuration.

Referring to FIG. 3, wherein like reference numbers refer to like components from FIGS. 1 and 2, an alternative embodiment of the second fluid circuit 66' is schematically depicted. The second fluid circuit 66' includes two heat exchangers in parallel that replace heat exchanger 82 of FIGS. 1 and 2. One of the heat exchangers 133 transfers thermal energy between the refrigerant 102 and air 122 for the passenger compartment, and the other heat exchanger 134 transfers thermal energy between the refrigerant 102 and the coolant 42 in the first fluid circuit.

While the best modes for carrying out the invention have been described in detail, those familiar with the art to which this invention relates will recognize various alternative designs and embodiments for practicing the invention within the scope of the appended claims.

The invention claimed is:

1. A vehicle characterized by regenerative braking comprising:
    a ground wheel;
    an energy conversion system;
    a first fluid circuit containing a first fluid, a compressor configured to pressurize the first fluid, and a first heat exchanger in fluid communication with the compressor;
    a second fluid circuit containing a second fluid, the second fluid circuit providing fluid communication between the energy conversion system and the first heat exchanger;

said first heat exchanger being configured such that the first fluid and the second fluid are in heat transfer relationship therein; and a braking system configured to selectively transmit energy from the wheel to the compressor, and wherein the compressor is configured to use the energy to pressurize the first fluid; and wherein the second fluid circuit further includes a passage in parallel with the first heat exchanger and a valve that is operative to selectively direct the second fluid to the first heat exchanger or to the passageway; and wherein the vehicle defines a passenger space, and wherein the vehicle further comprises a fan configured to direct air into thermal communication with said first heat exchanger and into the passenger space.

2. The vehicle of claim 1, wherein the first fluid circuit includes a second heat exchanger, and wherein the first fluid circuit further includes an expansion valve in series between said first and second heat exchangers.

3. The vehicle of claim 2, further comprising a controller operatively connected to the first fluid circuit and configured to cause the first fluid to flow in a first direction through the first fluid circuit so that the first heat exchanger is an evaporator in response to the existence of a first condition, and configured to cause the first fluid to flow in a second direction through the first fluid circuit so that the first heat exchanger is a condenser in response to the existence of a second condition.

* * * * *